UNITED STATES PATENT OFFICE.

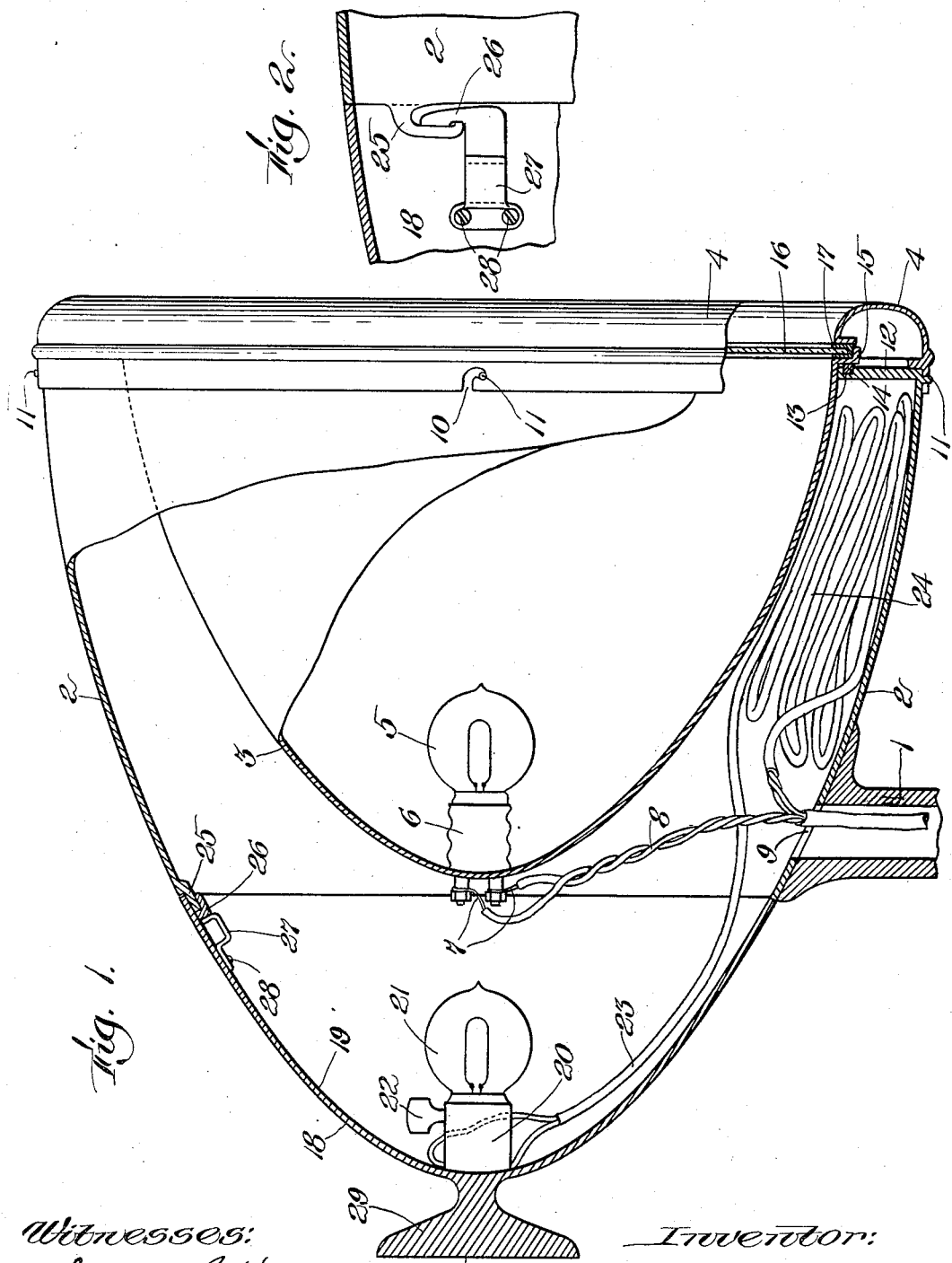

HENRY A. RUETER, OF JAMAICA PLAIN, MASSACHUSETTS.

COMBINED SEARCH AND FINDER LIGHT FOR AUTOMOBILES.

1,204,823.  Specification of Letters Patent.  Patented Nov. 14, 1916.

Application filed March 23, 1915. Serial No. 16,488.

*To all whom it may concern:*

Be it known that I, HENRY A. RUETER, a citizen of the United States, and resident of Jamaica Plain, in the county of Suffolk and State of Massachusetts, have invented an Improvement in Combined Search and Finder Lights for Automobiles, of which the following description, in connection with the accompanying drawings, is a specification, like letters on the drawings representing like parts.

My present invention is a combined searchlight for automobiles together with a detachable finder-light or "trouble finder," which has the advantage of a separate reflector, convenient location, always ready for use, and yet concealed from view and protected from weather conditions.

In the manufacture of automobile searchlights it is now customary to utilize a reflector for the searchlight of thin, fine spun metal, and to inclose the same in an outer casing of heavier metal to protect and guard the light. My present invention utilizes this general type of searchlight construction, but I so form the outer casing to have the rear or conical portion detachable and to be of sufficiently larger size than the light reflector to receive a small light. I further utilize the detachable part of the outer casing as a reflector for the detachable light. It is well-known that a small serviceable electric light is always necessary and invaluable in working about an automobile, illuminating different portions of the engine and car, and especially is this so in working about the car at night.

Referring to the drawings illustrating a preferred embodiment of the present invention, Figure 1 is a view partly in cross section of my searchlight and finder-light; and Fig. 2 is an enlarged view of the joint uniting the detachable part of the casing carrying the finder-light with the main part carrying the searchlight.

While I have illustrated my invention as applied to a searchlight, utilizing an electric lamp for the light, it may be readily understood that I may employ this invention with the ordinary acetylene type of light, if I desire.

Referring to the drawings, a supporting bracket 1 carries the outer casing 2 of an automobile searchlight of usual exterior outline, comprising a parabolic reflector 3 united to the casing 2 by a rim 4, which reflector has a lamp 5 positioned approximately at the focus and supported on a socket 6 and supplied with a suitable source of electrical energy through binding posts 7 and wires 8, the latter extending through an aperture 9 in the casing 2 and also through the hollow stem of the bracket 1.

The rim 4 is united to the casing 2 by bayonet joints comprising recesses 10 in which the periphery of the rim 4 and pins 11 affix it to the outer periphery of the casing 2. Said casing carries an inwardly extending flange 12 having a recess 13 to receive a yielding gasket 14, upon which the outwardly extending rim 15 of the reflector 3 is pressed by the rim 4, as clearly shown in Fig. 1. The inclosing lens 16 is preferably also held by the rim 4 against the outer surface of the flange 15 on the reflector 3, the periphery of said lens being inclosed by a rubber band 17, thus providing a moisture and dust proof joint.

I make the outer casing 2 with the rear or conical portion 18 detachable, said portion being substantially in the form of a parabolic reflector similar to that of the reflector 3 for the searchlight 5, and I may coat the inner surface 19 with silver, or the like, to make the detachable section 18 of reflective power. At the apex of the conical section 18 a socket 20 is secured, to which an electric lamp 21 is fitted in the usual manner, a switch 22 and wires 23 therefor being also provided. The wire 23 is preferably of considerable length and may have its coils 24 concealed in the space between the outer casing 2 and the reflector 3 with the end leading through the aperture 9 to the hollow bracket 1, as already described with the wires 8. The section 18 is preferably made with a flush joint to be secured to the rest of the casing 2, any suitable device being capable for this connection. As herein shown, I utilize a species of bayonet joint, comprising a plurality of depending lugs 25 formed integrally with the casing 2 and of hook form, to coöperate with a corresponding hook member 26 carried by the detachable portion 18, being preferably secured to a spring 27 held to the member 18 by bolts 28, and arranged about the periphery of the rim 18 in position to coöperate and lock with said lugs 25 by a bayonet joint movement. I may also provide the section 18 with a handle or stand 29, having a flat face 30, so that the entire section 18 may be detached, held in the hand of the user or stood upwardly on the ground or other support, resting on the flat surface 30, while the wire 23 is of sufficient length to permit this use. By arranging this finder-light as herein shown adjacent the engine where the searchlights usually are fixed, the finder-light is always ready for use, is out of the way, is concealed from view, is protected from weather or accidental injury, and is in a compact form and position. The addition of the reflecting surface 19 adds materially to the usefulness of such a finder-light, enabling the lamp 21 to be of small power, and, therefore, conserving the use of electrical energy which is an important feature in apparatus of this kind.

While I contemplate using the combined searchlight and finder-light with one searchlight only of an automobile, both searchlights may be thus formed, although in practice, I intend to use the apparatus herein shown as a companion or one of a pair with the combined horn and searchlight apparatus illustrated in my co-pending application, Serial No. 16,489, filed March 23, 1915.

Having described my invention, what I claim as new and desire to secure by Letters Patent is:

1. A combined searchlight and a removable finder-light for automobiles, comprising a searchlight reflector, an inclosing casing for said reflector of sufficient size to hold and receive an electric light between said outer casing and said reflector, said light holding portion consisting in a part of the casing and being detachable.

2. A combined searchlight and finder-light for automobiles, comprising a searchlight reflector, an inclosing casing for said reflector of sufficient size to hold and receive an electric light between said outer casing and said reflector, said light holding portion being detachable, and having a surrounding reflecting surface independent of the searchlight reflector.

In testimony whereof, I have signed my name to this specification, in the presence of two subscribing witnesses.

HENRY A. RUETER.

Witnesses:
JAMES R. HODDER,
SEBASTIAN VAUGHAN.